United States Patent Office 3,524,748
Patented Aug. 18, 1970

3,524,748
HIGH STRENGTH ALPHA- AND BETA-QUARTZ
GLASS-CERAMIC PRODUCTS AND METHOD
George H. Beall, Corning, N.Y., assignor to Corning
Glass Works, Corning, N.Y., a corporation of New
York
No Drawing. Filed June 26, 1967, Ser. No. 648,938
Int. Cl. C04b 33/00, 39/00
U.S. Cl. 106—39                                   5 Claims

ABSTRACT OF THE DISCLOSURE

This invention relates to the production of very high strength glass-ceramic articles through the controlled inversion of quartz. More particularly, this invention contemplates the formation of glass-ceramic articles having an integral surface compression layer therein beta-quartz (high quartz) is the primary crystal phase and an interior portion wherein alpha-quartz (low quartz) is the primary crystal phase.

---

Glass-ceramic articles are made through the controlled crystallization of glass body. The manufacturing process for such articles commonly comprises the steps of melting a glass-forming batch to which a nucleating agent has been included, the melt cooled sufficiently rapidly to obtain a glass shape of a desired configuration therefrom, and then this glass shape is heat treated in such a manner to first cause the development of nuclei therein and, thereafter, the temperature is raised to promote the growth of crystals on the sites provided by the nuclei. Since the crystallization is grown on the myriad of nuclei previously developed, the crystals are uniformly fine-grained and generally comprise at least 50% by weight of the article and often over 75% by weight. Further, since the crystals are grown in situ, the article is void-free and non-porous For a more comprehensive discussion of the character and production of glass-ceramic articles, reference is made to U.S. Pat. No. 2,920,971.

It has been recognized that an increase in the mechanical strength of glass and glass-ceramic articles can be imparted thereto by providing a compressive layer in and parallel with the surface thereof. One method of producing such a compression layer in a glass-ceramic article has involved the replacement of small monovalent metal ions present in the crystals of the glass-ceramic with larger monovalent metal ions at an elevated temperature but below that at which the crystal structure is altered. Since this exchange of ions is conducted at a temperature below that at which the crystal structure is thermally altered, the stresses set up in the surface of the glass-ceramic due to the "crowding" of the larger ions into the crystal structure are not relieved and this surface layer is thereby placed under high compressive stress. This method, as is described in British Pat. No. 917,388, requires contacting the glass-ceramic article with a source of larger monovalent ions, commonly a bath of molten salt, at a relatively high temperature. Such a technique is in commercial use but, of course, necessitates another step in the stream of production and, as such, increases the cost of manufacture of the products.

I have now discovered a new method for producing a surface compression layer in certain glass-ceramic articles whereby extremely high mechanical strengths can be obtained without the use of molten salt baths or other source or exchangeable metal ions and wherein the chemical composition of the glass-ceramic article remains unchanged throughout.

In its broadest terms, my invention comprises heat treating a glass body consisting essentially, by weight on the oxide basis, of about 40–70% $SiO_2$, 10–35% $Al_2O_3$, 2–15% MgO, and about 2–12% $ZrO_2$ as the nucleating agent to obtain a uniformly fine-grained glass-ceramic article wherein a low expansion beta-quartz solid solution constitutes the predominant crystal phase. These beta-quartz solid solutions have a hexagonal trapezohedral structure and will invert to the high expansion alpha-quartz form which has a trigonal trapezohedral structure if cooled slowly. Thus, at temperatures of about 900°–1000° C., beta-quartz solid solution is formed which will not invert to the alpha-quartz structure upon cooling. However, at temperatures above 1000° C. the beta-quartz solid solution breaks down to a siliceous beta-quartz solid solution plus spinel. This siliceous beta-quartz solid solution will invert to alpha-quartz upon cooling unless quenched. Therefore, upon completion of the crystallization step, the glass-ceramic articles are controlled quickly enough to a temperature at least below the alpha-beta quartz inversion, which is 573° C. for pure $SiO_2$ quartz and is lower for quartz solid solutions, in order to produce a low expansion beta-quartz solid solution surface layer on a high expansion alpha-quartz interior portion.

In carrying out this invention, batches for the examples reported in Table I were compounded and ballmilled together prior to melting in order to obtain more efficient melting and better glass homogeneity. The batches may be composed of any materials, either oxides or other compounds, which, on being melted together, are converted to the desired oxide compositions in the proper proportions. Thus, Table I records glass compositions operable in my invention on the oxide basis in weight percent. The glass-forming batches were melted at 1600°–1650° C. for about 5–16 hours in open platinum crucibles, those compositions containing large amounts of $Al_2O_3$ and/or $ZrO_2$ requiring higher melting temperatures. The melts were poured onto steel plates to give patties about ¼″ thick. Pieces of cane about ¼″ in diameter were also drawn from the melts by hand for use in physical properties measurements. The patties were transferred to an annealer operating at 750°–850° C. and cooled as a glass therein to room temperature. These glass shapes were then placed in an electrically-fired furnace and heated at about 5° C./minute to a temperature between about 1000°–1250° C. and maintained within that range for a period of time sufficient to attain the desired highly-crystalline, fine-grained glass-ceramic articles. Thereafter, the crystallized shape were cooled to between about 750–1100° C. inside the furnace and then removed from the furnace and allowed to cool in the ambient atmosphere to room temperature. The shapes can be more quickly chilled by placing in a stream of cool air. Water quenching is normally too severe and cracking and breaking frequently result. Quenching the glass-ceramics by plunging into a molten salt bath operating at about 200°–500° C. is also possible but unnecessary since the air quenching is generally adequate to insure the development of the desired surface compression layer. It is estimated that the surface of the article is usually cooled to at least below the inversion temperature of pure $SiO_2$ quartz (573° C.) within about 10–60 seconds.

It can be appreciated that the heat-up schedule employed to crystallize the glass shapes is chosen to protect the shapes from thermal shock and deformation. The 5° C./minute rate has been found to be satisfactory in most instances in inhibiting breakage due to thermal shock and excessive deformation of the glass shape as it is being heated beyond its softening point and before crystallization has progressed sufficiently to support the shape. In the crystallization process, it is generally believed the nuclei are first formed as the glass is heated within the transformation range thereof. The transformation range is the temperature at which a liquid melt is deemed to have become a glass solid, this temperature being in the vicinity of the annealing point of the glass. These nuclei then provided sites for the growth of crystals thereon. Crystallization of the glass proceeds more rapidly as the temperature approaches the liquidus of the crystal phase and, therefore, the temperature of the shape is normally raised above that utilized for nucleation, i.e., above the softening point of the glass, in order to expedite crystallization. Nevertheless, at the beginning of crystallization, the proportion of crystals to glassy matrix is small and the article will not retain its shape if the temperature is raised too rapidly above the transformation range. Hence, the rate of temperature increase must be in substantial accord with the rate of crystallization or deformation, due to a lowering of viscosity, will render the final product generally of little use. Therefore, I prefer to raise the temperature at not more than about 5° C./minute in order to attain dense crystallization with little or no deformation as the articles are heated above the soften point of the glass. However, more rapid heating rates have been used successfully, particularly where some physical support has been provided for the articles.

Where more efficient and economical use of heat is sought, the heat treatment may be carried out immediately following the shaping of the glass while it is still hot, rather than cooling to room temperature and subsequently reheating. Hence, the glass shape may merely be cooled to just below the transformation range and then reheated to nucleate and crystallize it.

It will be recognized that the crystallization of the glasses of this invention is a time-temperature dependent process. Thus, where the glass shape is heated to a temperature near the lower end of the crystallization range and held thereat until a densely crystalline glass-ceramic article is obtained, the dwell period will be relatively long, perhaps 4–8 hours. But, where temperatures near the upper end of the crystallization range are used, dwell periods as short as about ½–4 hours may be adequate. Much longer holding times may be employed but the properties of the crystallized products are essentially the same. My preferred practice contemplates a two-step heat treating process wherein the glass article is first heated to a temperature between about 800°–950° C. and held thereat for about 1–8 hours to assure substantial nucleation and beginning crystallization. Thereafter, the temperature is raised to between about 1000°–1150° C. and held thereat for about 2–8 hours to obtain a dense, fine-grained body. Such a practice generally yields a body showing very little, if any, deformation.

As was noted above, a crystallization temperature of at least 1000° C. is required to promote the breakdown of the metastable, non-inverting beta-quartz solid solution to a siliceous beta-quartz solid solution which will invert to alpha-quartz unless cooled rapidly. Hence, without this development of a siliceous beta-quartz solid solution, the production of an integral composite article having a surface layer containing crystals of beta-quartz solid solution and an interior portion containing crystals of alpha-quartz solid solution would not be possible. Temperatures above about 1250° C. cause deformation and, occasionally, actual melting will occur.

Finally, it will be understood that a dwell period at any specific heat treating temperature is not required. Thus, a gradually increasing temperature above the transformation range may be employed, this increase preferably being balanced by the attendant rate of crystallization to prevent deformation. And, of course, changes within the heat treating range, whether higher or lower, are contemplated within the inventive process.

As was observed above, the crystallized articles of this invention are quenched at temperature ranging from about 750°–1100° C. At temperatures much above 11000 C., the hazard of thermal breakage is very real and at temperatures below about 750° C. the quenching is not rapid enough to prevent invertion of the siliceous beta-quartz solid solution in the surface to alpha-quartz.

The above-recited ranges of $SiO_2$, $Al_2O_3$, MgO, and $ZrO_2$ have been found necessary to yield the desired glass-ceramic products. ZnO in amounts up to about 15% by weight can be present and enters into the crystal structure along with, and in substitution for, MgO. Small amounts of other compatible metal oxides such as $Li_2O$, $Nb_2O_3$, $Ta_2O_3$, CaO, BaO, $TiO_2$, and $B_2O_3$ may also be present but the individual amount of addition should not exceed about 4% by weight and the total of such additions is preferably less than 10% by weight. $Na_2O$ and $K_2O$ are preferably absent but may be tolerated in amounts up to about 3% by weight total.

Although the melts described hereafter did not contain a fining agent, it will be appreciated that in commercial production a conventional fining agent such as $As_2O_3$ may be added to the batch. Commonly, about 0.5–1% by weight is added and, since the quantity remaining in the glass after the batch has been melted is too small to have any material effect on the properties of the glass, its omission from these melts was not deemed to be improper.

TABLE I

| | 1 | 2 | 3 | 4 | 5 | 6 | 7 | 8 | 9 | 10 | 11 |
|---|---|---|---|---|---|---|---|---|---|---|---|
| $SiO_2$, percent | 64.7 | 60.1 | 62.1 | 65.7 | 45.0 | 66.6 | 67.8 | 67.5 | 66.6 | 45.0 | 51.6 |
| $Al_2O_3$, percent | 19.4 | 20.4 | 20.4 | 19.7 | 28.9 | 19.0 | 20.2 | 21.1 | 21.0 | 32.4 | 26.3 |
| MgO, percent | 8.3 | 6.4 | 6.4 | 8.4 | 5.4 | 2.9 | 3.9 | 5.8 | 5.7 | 13.6 | 12.6 |
| $ZrO_2$, percent | 7.6 | 7.6 | 7.6 | 6.2 | 9.0 | 4.8 | 3.8 | 3.8 | 4.8 | 9.0 | 5.6 |
| ZnO, percent | | 5.5 | 3.5 | | 11.7 | 4.8 | 1.9 | | | | |
| $Li_2O$, percent | | | | | | 1.9 | 2.4 | 1.8 | 1.9 | | |
| $TiO_2$, percent | | | | | | | | | | | 3.7 |
| Melting temp., °C | 1,650 | 1,650 | 1,650 | 1,600 | 1,650 | 1,650 | 1,600 | 1,600 | 1,600 | 1,650 | 1,625 |

Table II records the heat treating schedules utilized (a 5° C./minute temperature increase being employed), the crystal phases present as determined by X-ray diffraction analysis, and some measurements of bulk coefficients of thermal expansion ($\times 10^{-7}$/° C. between 25°–300° C.) and modulus of rupture (MOR) determined in the conventional manner.

TABLE II

| Example No. | Heat treating schedule | Crystal phases | Exp. coeff. | MOR (p.s.i.) |
|---|---|---|---|---|
| 1 | 900° C. for 4 hours, 1,060° C. for 6 hours, quenched from 800° C. | Interior: alpha-quartz solid solution, minor cubic $ZrO_2$ and spinel; surface layer: beta-quartz solid solution, minor cubic $ZrO_2$. | 50 | 65,000 |
| 2 | 900° C. for 6 hours, 1,050° C. for 6 hours, quenched from 800° C. | Interior: alpha-quartz solid solution, minor cubic $ZrO_2$ and gahnite-spinel; surface layer: beta-quartz solid solution, minor cubic $ZrO_2$. | 130 | 45,000 |
| 3 | 800° C. for 6 hours, 1,060° C. for 6 hours, quenched from 800° C. | Interior: alpha-quartz solid solution, minor cubic $ZrO_2$ and spinel; surface layer: beta-quartz solid solution, minor cubic $ZrO_2$. | | 54,000 |
| 4 | 960° C. for 6 hours, 1,060° C. for 6 hours, quenched from 800° C. | do | | 30,000 |
| 5 | 910° C. for 6 hours, 1,010° C. for 6 hours, quenched from 800° C. | Interior: alpha-quartz solid solution, minor cubic $ZrO_2$ and gahnite-spinel; surface layer: beta-quartz solid solution, minor cubic $ZrO_2$. | | 35,000 |
| 6 | 950° C. for 8 hours, 1,100° C. for 6 hours, quenched from 800° C. | Interior: alpha-quartz solid solution, minor cubic $ZrO_2$ and spinel; surface layer: beta-quartz solid solution, minor cubic $ZrO_2$. | | |

TABLE II—Continued

| Example No. | Heat treating schedule | Crystal phases | Exp. coeff. | MOR (p.s.i.) |
|---|---|---|---|---|
| 7 | 850° C. for 4 hours, 1,200° C. for 4 hours, quenched from 900° C. | Interior: alpha-quartz solid solution, minor cubic $ZrO_2$; surface layer: beta-quartz solid solution, minor cubic $ZrO_2$. | | |
| 8 | 800° C. for 6 hours, 1,050° C. for 6 hours, quenched. | ----do---- | | |
| 9 | 980° C. for 4 hours, 1,140° C. for 6 hours, quenched from 800° C. | Interior: alpha-quartz solid solution, minor cubic $ZrO_2$, trace of beta-spodumene and spinel; surface layer: beta-quartz solid solution, minor cubic $ZrO_2$. | | |
| 10 | 780° C. for 4 hours, 1,100° C. for 4 hours, quenched from 800° C. | Interior: alpha-quartz solid solution, minor cubic $ZrO_2$, sapphirine, and spinel; surface layer: beta-quartz solid solution, minor cubic $ZrO_2$ and spinel. | | 49,000 |
| 11 | 860° C. for 4 hours, 1,060° C. for 4 hours, quenched from 800° C. | Interior: alpha-quartz solid solution, minor cubic $ZrO_2$ and spinel; surface layer: beta-quartz solid solution, minor cubic $ZrO_2$ and spinel. | 108 | 75,000 |

Table II clearly illustrates the effectiveness of my invention in producing a glass-ceramic body having an integral surface layer therein containing crystals exhibiting a lower coefficient of thermal expansion than the crystals present in the interior portion. This difference in thermal expansion results in this surface layer being under a high compressive stress. The effect of this surface compression layer in improving the mechanical strength of the articles several fold can be appreciated when it is realized that glass-ceramic bodies of these compositions when not quenched to develop the surface layer thereon exhibit modulus of rupture measurements between about 10,000–15,000 p.s.i.

Example 11 is my preferred composition since very high mechanical strengths are obtained therein and these strengths are reproducible. The beta-alpha quartz solid solution inversion temperature was measured therein at 520° C., i.e., about 50° C. below the inversion temperature of pure $SiO_2$ quartz.

The crystal contents of these articles are high, at least 50% by weight and generally in excess of 75% by weight. The crystals themselves are fairly uniformly-sized and are substantially all finer than 20 microns in diameter.

The surface layer developed is not completely uniform in depth such that an unwavering demarcation line can be observed under a microscope. However, laboratory examination has shown that the depth of this layer should preferably be at least 1 mm. in order to assure the high strength desired.

I claim:

1. A glass-ceramic article with a crystal content greater than 50% by weight of the article having an interior portion containing crystals of alpha-quartz solid solution as the predominant crystal phase and a surface compression layer having a coefficient of thermal expansion lower than that of the interior portion and containing crystals of beta-quartz solid solution as the predominant crystal phase, the composition of the article being essentially the same throughout and consisting essentially, by weight on the oxide basis, of about 40–75% $SiO_2$, 10–35% $Al_2O_3$, 2–15% MgO, and 2–12% $ZrO_2$.

2. A glass-ceramic article according to claim 1 wherein said surface compression layer is at least 1 mm. in depth.

3. A method for making a glass-ceramic article having an interior portion containing crystals of alpha-quartz solid solution as the predominant crystal phase and a surface compression layer having a coefficient of thermal expansion lower than that of the interior portion containing crystals of beta-quartz solid solution as the predominant crystal phase which comprises melting a batch for a glass consisting essentially, by weight on the oxide basis, of about 40–75% $SiO_2$, 10–35% $Al_2O_3$, 2–15% MgO, and 2–12% $ZrO_2$, simultaneously cooling the melt below the transformation range thereof and shaping a glass body therefrom, thereafter heating said body to a temperature between about 1000°–1250° C. for a period of time sufficient to attain the crystallization of siliceous beta-quartz solid solution within the glass body, and then quickly cooling the crystallized body from a temperature range of about 750°–1100° C. to a temperature at least below the inversion temperature of pure $SiO_2$ quartz.

4. A method for making a glass-ceramic article according to claim 3 wherein the time sufficient to attain the crystallization of siliceous beta-quartz solid solution ranges from about ½–8 hours.

5. A method for making a glass-ceramic article according to claim 3 wherein said glass body is heated to about 800°–950° C. for 1–8 hours to cause substantial nucleation thereof prior to crystallizing said glass body at 1000°–1250° C.

References Cited

UNITED STATES PATENTS

| 2,998,675 | 9/1961 | Olcott et al. | 106—39 X |
| 3,238,085 | 3/1966 | Hayami et al. | 106—39 X |
| 3,252,811 | 5/1966 | Beall | 106—39 |
| 3,275,493 | 9/1966 | MacDowell | 106—39 X |
| 3,380,818 | 4/1968 | Smith | 65—33 |
| 3,428,513 | 2/1969 | Denman | 161—1 |
| 3,445,252 | 5/1969 | MacDowell | 106—39 |

OTHER REFERENCES

Urnes, Sigmund: Crystallization Studies of $Na_2O$-$Al_2O_3$-$SiO_2$ Base Glasses in Advances in Glass Technology, New York (Plenum Press) 1962, (I) pp. 377–381.

HELEN M. McCARTHY, Primary Examiner

W. R. SATTERFIELD, Assistant Examiner

U.S. Cl. X.R.

65—33; 161—1